United States Patent [19]

Kalaf et al.

[11] Patent Number: 5,049,752

[45] Date of Patent: Sep. 17, 1991

[54] SCANNING CIRCUIT

[75] Inventors: Thomas R. Kalaf, Irvine; William R. Reitman, Santa Ana, both of Calif.

[73] Assignee: Grumman Aerospace Corporation, Bethpage, N.Y.

[21] Appl. No.: 608,976

[22] Filed: Oct. 31, 1990

[51] Int. Cl.$^5$ .......................................... H01L 27/146
[52] U.S. Cl. ................. 250/370.08; 250/332; 250/338.4
[58] Field of Search ................. 250/332, 338.4, 370.08

[56] References Cited

U.S. PATENT DOCUMENTS

| | | | |
|---|---|---|---|
| 3,665,196 | 5/1972 | MaCall | 250/349 |
| 4,495,415 | 1/1985 | Kawabata | 250/336.1 |
| 4,633,086 | 12/1986 | Parrish | 250/338.1 |
| 4,779,004 | 10/1988 | Tew et al. | 250/578 |
| 4,868,389 | 9/1989 | Moore | 250/332 |

Primary Examiner—Costantine Hannaher
Attorney, Agent, or Firm—Stetina and Brunda

[57] ABSTRACT

A scanning circuit for improving the signal-to-noise ratio of the output of detector elements in an infrared detector array and for providing a more complete representation of objects within the detector elements field of view is disclosed. The circuit comprises circuitry for accumulating charges representative of the outputs of the detector elements during a charge accumulation interval and circuitry for outputting signals representative of the accumulated charges to external circuitry during an output interval. The charge integration interval is longer in duration than the output interval, thus providing increased detector element integration time.

24 Claims, 4 Drawing Sheets

SCANNING CIRCUIT

FIELD OF THE INVENTION

The present invention relates generally to electronic signal processing circuitry and more particularly to a scanning circuit for improving the signal-to-noise ratio of the outputs of detector elements in an infrared detector array and for providing a more complete representation of objects within the detector elements' field of view.

BACKGROUND OF THE INVENTION

Infrared detector arrays for satellite use are well known. Current infrared detection systems incorporate arrays of large numbers of discrete, highly sensitive detector elements, the outputs of which are connected to sophisticated processing circuitry both on the focal plane and in an on-board data processor. The on-board data processor rapidly analyzes the pattern and sequence of detector element excitations to identify and monitor sources of infrared radiation.

A contemporary subarray of detectors may contain 256 detectors on a side, or a total of 65,536 detectors. The size of each square detector is approximately 0.009 cm on a side with 0.00127 cm spacing between detectors. Such a subarray would therefore be 2.601 cm on a side. The subarray may, in turn, be joined to form an array that connects 25,000,000 or more detectors.

It is desirable to keep the array scan cycle as short as possible to maintain the highest possible array frame scan rate. This provides the highest possible number of frames per minute. The higher the array frame scan rate, the quicker the image data is updated and the sooner any change will be detected.

In the contemporary infrared detector element arrays the scan cycle is divided into two equal portions. During the first portion, called the charge accumulation interval, the outputs of dedicated detector elements are simultaneously accumulated upon a plurality of capacitors and stored as charges. During the second portion of the scan cycle, called the output interval, signals representative of these stored charges are output to external processing circuitry.

It is desirable to increase the interrogation time or charge integration interval to the maximum time interval possible to improve the signal-to-noise ratio of the detector element output. The signal-to-noise ratio is improved by increasing interrogation time because transient output fluctuations due to noise become a lower proportion of the total output signal as the amount of the total output signal is increased. Fluctuations due to noise also tend to cancel over time, therefore making the integration of the current output of the detector elements over a comparatively long time interval a desirable method for improving the signal-to-noise ratio of the detector element outputs.

The shorter the interrogation time, the greater the effect of any variation in the output signal due to noise. For instance, if the interrogation time were limited to the time interval during which a noise spike occurred, the output signal would consist substantially of the noise spike and would consequently provide erroneous data. However, if that same noise spike occurred at some point during a much larger interval of time and the output of the detector element was averaged or integrated over that larger interval of time, then the effect of the noise spike would be proportionally reduced and the data thus provided would be much more useful.

An erroneous reading can also occur when a change in detector output occurs during the charge accumulation interval. A change in detector output occurs when the detected image changes, such as when an object moves into the field of view.

The inherent characteristics of the detector element and its associated circuitry cause the detector output signal to rise with a finite slope when a detector element is excited. This slope typically occurs over an interval of time greater than the charge accumulation interval of contemporary infrared detector arrays. The interrogation of a detector element during a period of time when the output signal is rising, for example, may either be interpreted by the processing circuitry, i.e. the analog to digital converter, as an unchanged output or as an increased output depending upon the amount by which the detector output has increased. The result depends upon exactly when the detector element is interrogated. Therefore, it is possible for an increase in detector output to be interpreted by the processing circuitry as either no change or an increased output when the actual level of the detector is increasing. This is possible because of the discrete quantization involved in the analog to digital conversion process.

It would be desirable to increase the interrogation time or charge accumulation interval of the detector elements without reducing the frame scan rate. This would provide a more reliable interpretation of the detector element signals without reducing the rate at which information is processed. It would result in a more complete and reliable representation of objects within the detector element field of view. It would also allow the on-board signal processor to recognize a change in the field of view of the detector element array at the earliest possible time.

As such, although the prior art has recognized the need for increased detector element interrogation time to improve the signal-to-noise ratio and to improve the reliability of the digitization process without reducing the frame scan rate, the problem has heretofore never been addressed.

SUMMARY OF THE INVENTION

The present invention comprises a scanning circuit for improving the signal-to-noise ratio of the outputs of detector elements in an infrared detector array and for providing a more complete representation of objects within the detector elements field of view. The scanning circuit comprises circuitry for accumulating charges representative of the outputs of the detector elements during a charge integration interval and circuitry for outputting signals representative of the accumulated charges to external circuitry in an output interval which is shorter in duration than the charge integration interval. The use of a shorter output interval provides more time during the scan cycle for the charge accumulation interval.

The signal-to-noise ratio is increased by increasing the interrogation time of the detector elements which is accomplished by increasing the length of the charge integration interval. The reliability of the analog to digital conversion process is improved when the interrogation time is increased because a more complete sample of the detector output is then provided to the analog to digital converter. This reduces the probability that the signal provided to the sample and hold from a detector element will be substantially comprised of the transition, or sloped portion of the signal which occurs when the field of view changes. It thereby reduces the likelihood of an erroneous analog to digital conversion occurring because of the possibility of the transition not reaching the threshold of the analog to digital converter.

The scanning circuit comprises a plurality of charge integrators which convert the current output of each detector element into a voltage representative of the total amount of current output by the detector element during a predetermined time interval. By providing a signal representative of the output of detector over a time interval the effects of transient noise pulses are minimized and analog to digital conversion reliability is increased. The scanning circuit also comprises a multiplexing switch for each charge integrator for applying the voltage output of each charge integrator to a common output bus. The charge accumulation interval and the output interval occur within a scan cycle which is not increased in duration, thus maintaining the frame scan rate.

These, as well as other future advantages will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention with the illustrated embodiments. It is to be understood, however, that the same or equivalent functions and sequences may be accomplished by different embodiments that are also intended to be encompassed within the spirit and scope of the invention.

Figure 4:
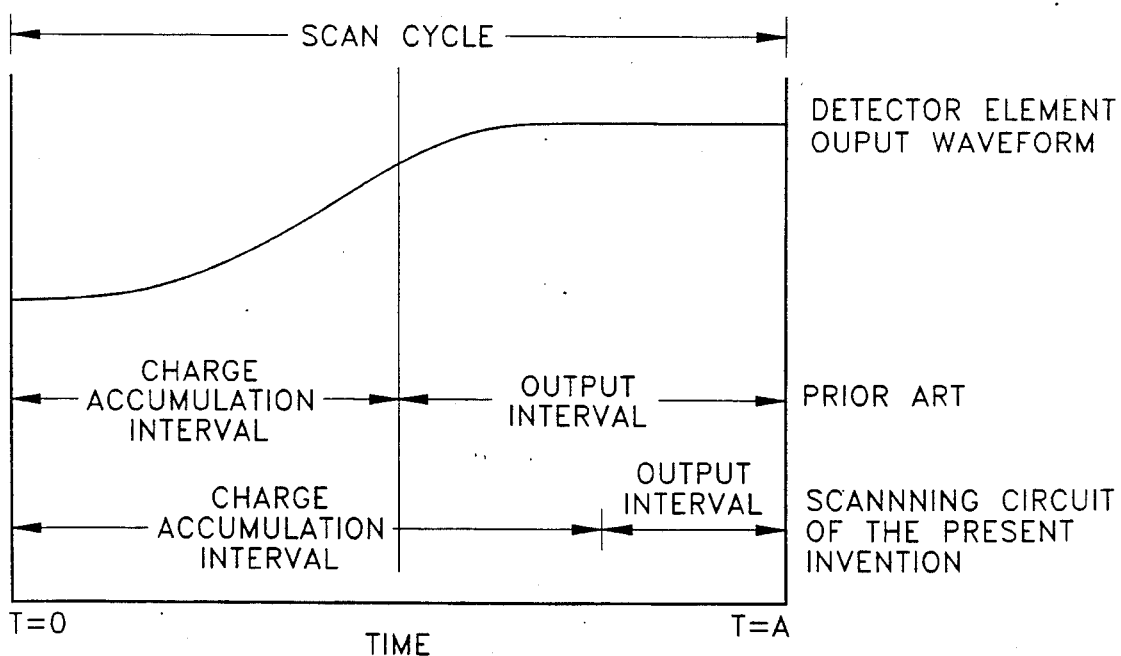
FIG. 4 is a graphic illustration of a sample detector element output waveform illustrating an increase in output level as would occur when an infrared source enters the field of view of the detector element.
Figure 5:
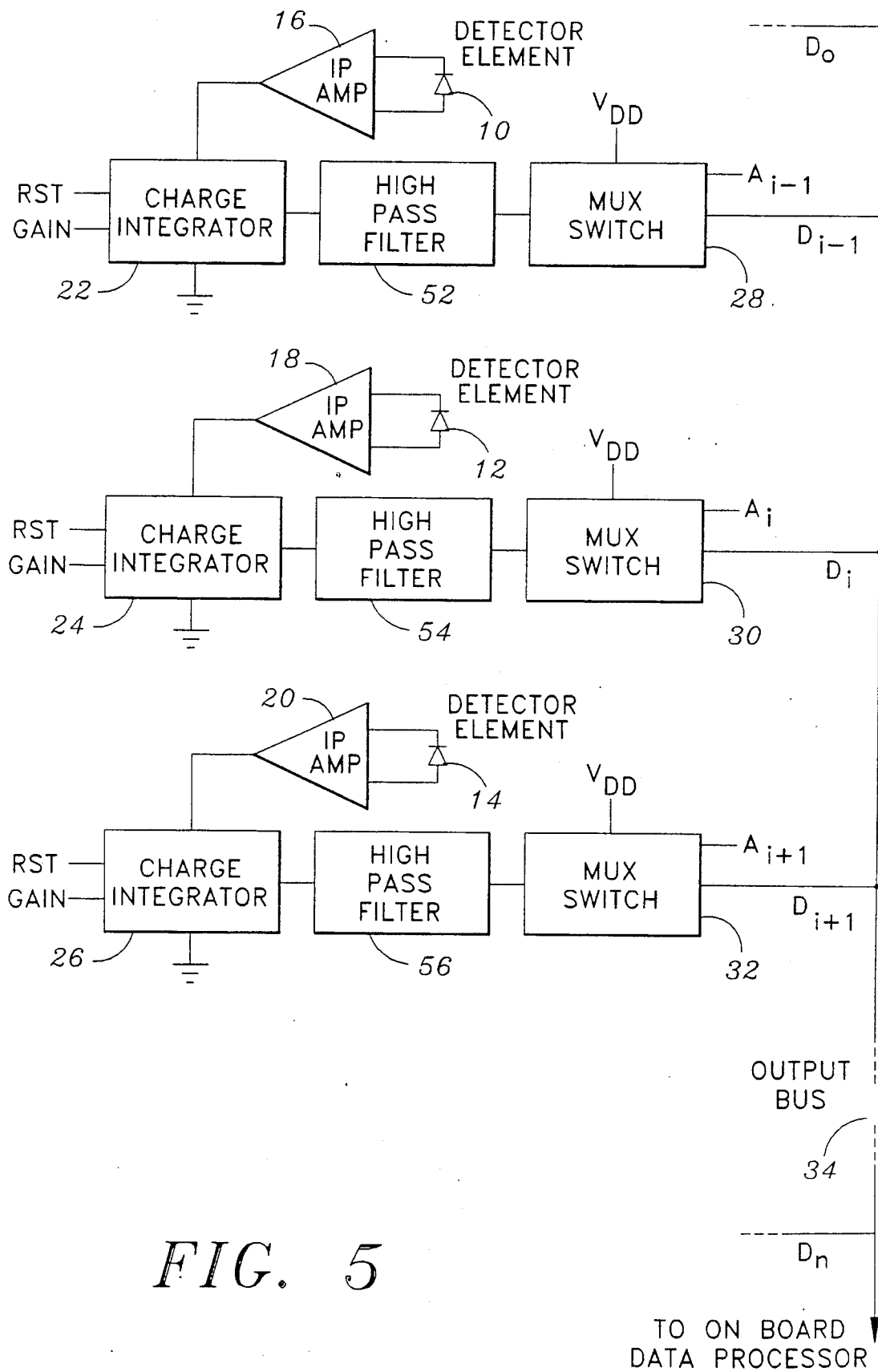
FIG. 5 is an electrical block diagram of a representative portion of the scanning circuit showing the interconnection of the charge integrators, high pass filters, and multiplexing switches to the detector elements and output bus.
Figure 6:
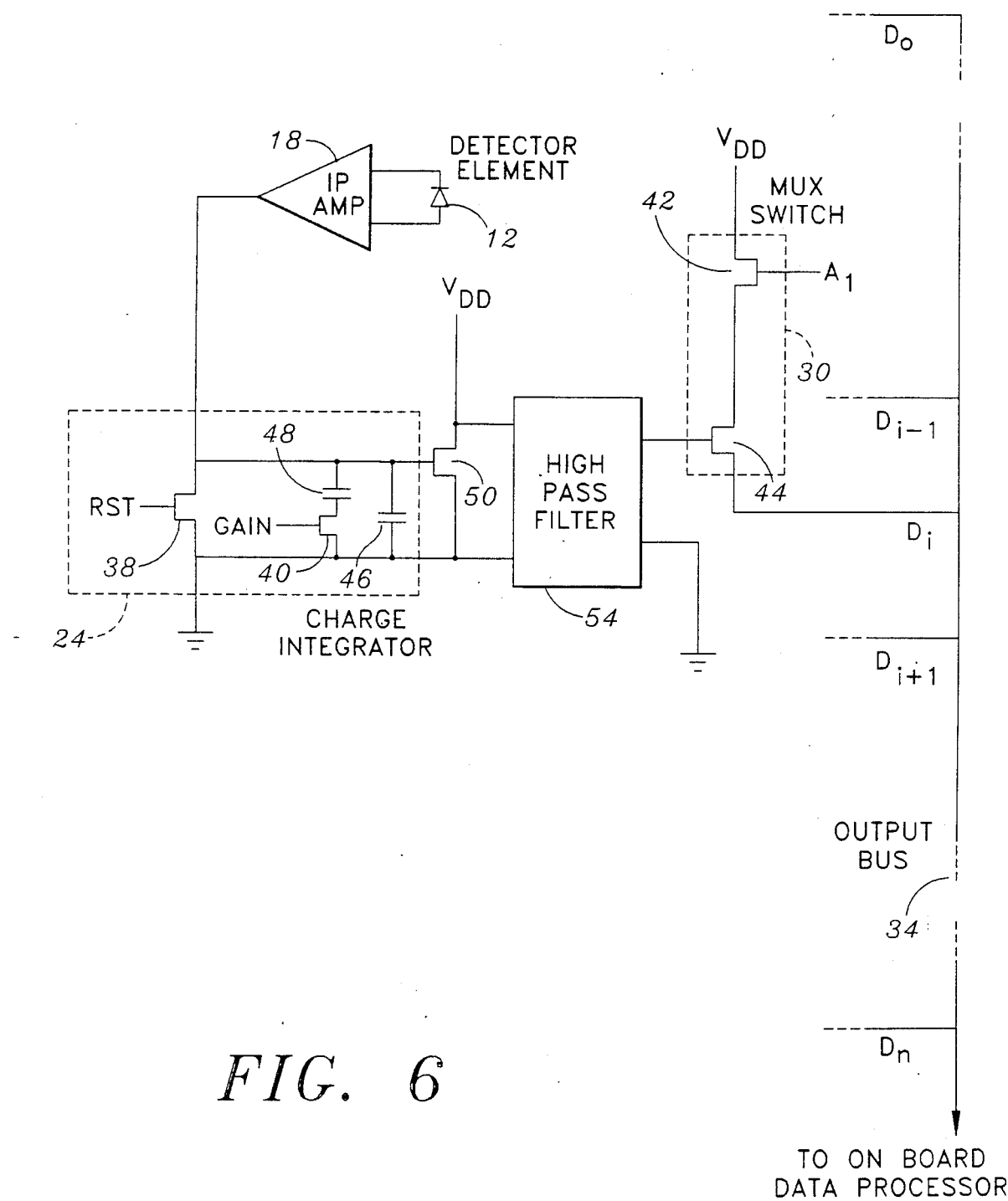
FIG. 6 is an electrical schematic depicting the charge integrator of FIG. 5 in further detail.

The scanning circuit of the present invention is illustrated in FIGS. 5 and 6 which depict a presently preferred embodiment of the invention. FIGS. 1 through 4 provide a graphic representation of the principles involved in the practice of the present invention.

Figure 1:
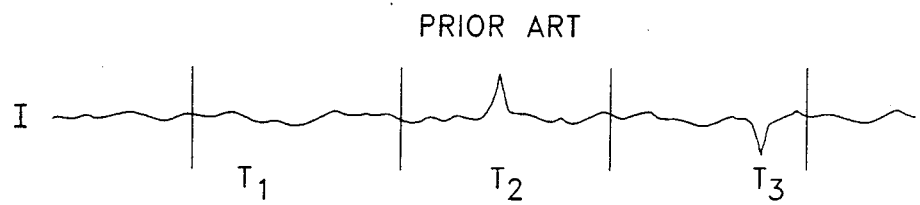
FIG. 1 is a graphic illustration of a sample detector element output waveform showing three time intervals ($T_1$, $T_2$, $T_3$) during which the waveform may be interrogated as is done in the prior art.

Referring now to FIG. 1, interrogation time intervals $T_1$, $T_2$, and $T_3$ are illustrated as they could be applied in the prior art to the output of an infrared detector element. Interrogation is the process of accepting a signal from a detector element. In the prior art the detector element outputs are interrogated over comparatively short time intervals such as $T_1$, $T_2$ and $T_3$.

Figure 2:
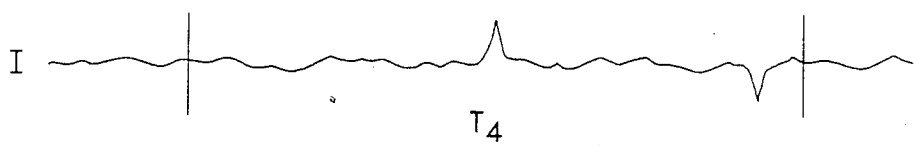
FIG. 2 is a graphic illustration of a single detector element output waveform showing an increased time interval ($T_4$) during which the scanning circuit of the present invention interrogates the detector element.

The wave forms shown at FIGS. 1 and 2 represent the current output of an infrared detector element under steady state excitation conditions. Any deviations in the signal, such as the positive and negative spikes occurring during intervals $T_2$ and $T_3$ of FIG. 1, are due to transient noise. A measurement of the current during time interval $T_1$ would result in a measured quantity essentially equivalent to the noise-free output current of the detector. However, measurements taken during intervals $T_2$ and $T_3$ would result in measured currents deviating substantially from the noise-free output of the detector element, since intervals $T_2$ and $T_3$ include transient spikes caused by noise. A measurement of the detector element current during time interval $T_2$ would therefore result in a measured current of a higher level than the noise-free current output of the detector. A current measurement taken during interval $T_3$ would result in a lower measured current level than the noise-free current output of the detector element.

It is the purpose of the present invention to average out these periodic fluctuations in the output current by integrating the detector element output current over an increased period of time. Integrating is the process of accumulating a charge over time, such as in charging a capacitor. Integration, in effect, averages the signal. Periodic fluctuations due to noise are thus reduced in effect and tend to cancel each other. This is accomplished by increasing the time interval as depicted by $T_4$ of FIG. 2.

Increasing the time interval causes transient conditions such as the two spikes within interval $T_4$ to comprise a far lower proportion of the total measured signal. Therefore, their effect is correspondingly lower. Also, the increase in current caused by the first (positive) spike tends to be substantially offset by the decrease in current caused by the second (negative) spike, illustrating how noise components can tend to cancel. A current measurement integrated over time interval $T_4$ will therefore reflect a quantity substantially the same as the noise-free detector output current.

The benefits of such increased integration have long been recognized in the art. However, the requirement that detector elements be interrogated within a charge accumulation interval which is equal in duration to the output interval coupled with the desire to maintain the frame scan rate has limited the time available for integration.

The present invention increases the length of the charge accumulation interval by reducing the length of the output interval. Thus, the duration of the scan cycle remains unchanged and the frame scan rate is maintained.

Figure 3:
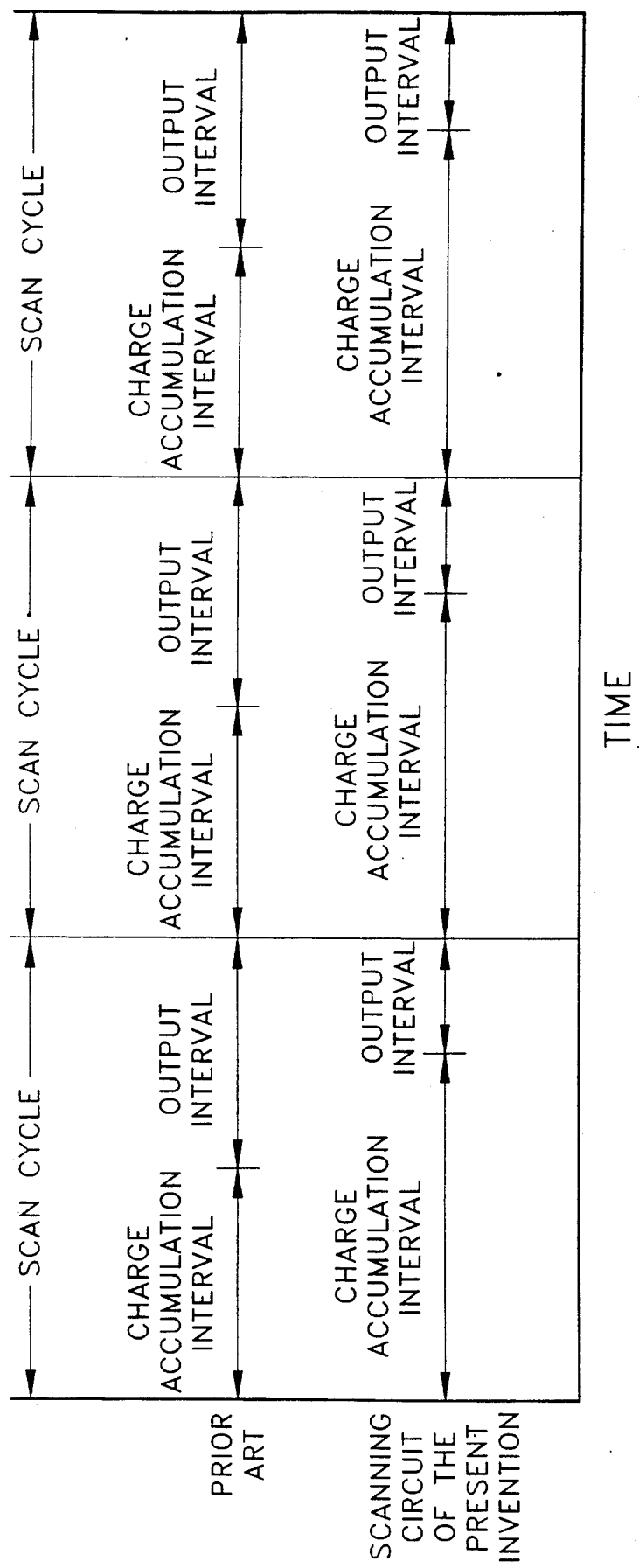
FIG. 3 is a chart comparing the integration and output intervals of the present invention with those of the prior art.

Referring now to FIG. 3, the relative durations of the charge accumulation interval and the output interval of the prior art can be compared to those of the scanning circuit of the present invention. In both the prior art and the present invention, the charge accumulation interval and the output interval occur within the scan cycle. This limitation is required in order to maintain the frame scan rate of the infrared detector array.

The present invention can also be practiced by permitting the output interval to fall outside of the scan cycle if it is not essential that the frame scan rate be maintained. The outputting of signals representative of the accumulated charges would then be delayed with respect to the accumulating of charges representative of the outputs of detector elements.

As shown in FIG. 3, the charge accumulation interval and the output interval are equal in duration. The scanning circuit of the present invention provides a means of reducing the duration of the output interval to permit an increase in the length of the charge accumulation interval as shown.

Referring now to FIG. 4, the output of a detector element as an infrared source enters the detector element's field of view is illustrated. The output transitions from an initial level at T=0 to a final level at T=A. The level ramps up from T=0 to T=A with a slope that is determined by the inherent response characteristics of the detector element and its associated circuitry.

Interrogation of the detector element during the prior art charge accumulation interval will cause different results in the analog to digital conversion process depending upon which portion of the sloped signal is captured. Capturing the lower level portion of the signal will be interpreted as no change in the detector output while capturing more of the increased level will be interpreted as an increase in detector output. The interpretation of the detector element output signal depends upon precisely when it is interrogated.

Ambiguous results occur when the quantization levels of the analog to digital converter are such that the detector element output integrated during the lower level portion of the output signal is below the analog to digital quantization threshold, and the detector element output integrated during the higher level portion of the output signal is above that threshold. The possibility of an erroneous interpretation occurring is increased because of the comparatively short length of the prior art interrogation intervals.

The present invention decreases the severity of this problem by increasing the charge accumulation interval. By increasing the interrogation time, the present invention minimizes the likelihood of interrogating solely during an output transition which would give an erroneous results. That portion of the waveform subject to ambiguous interpretation by the analog to digital circuitry thus comprises a small proportion of the output captured during increased charge accumulation interval. The increased level output signal captured during the remainder of the charge accumulation interval provides an unambiguous increase in level which will be interpreted as such by the analog to digital converter. The use of increased charge accumulation interval therefore improves the reliability of the analog to digital conversion process.

In the present invention detector element interrogation occurs during the increased charge accumulation interval and output from the scanning circuit occurs during the decreased output interval. Both intervals must occur with a time equal to the output interval one scan cycle. Therefore, the scan cycle length determines the maximum time available for detector element interrogation and output.

Referring now to FIG. 5, a block diagram of a representative portion of the scanning circuit is illustrated. The illustrated portion of the scanning circuit comprises a plurality of charge integrators, 22, 24 and 26, each charge integrator being connected to dedicated detector elements 10, 12 and 14. Each charge integrator 22, 24, and 26 is a circuit for accumulating charges representative of the output of its respective detector element 10, 12, or 14 over the charge accumulation interval.

The output of each detector 10, 12 and 14 is amplified by input amplifiers 16, 18, and 20 prior to being communicated to the charge integrators 22, 24 and 26. High pass filters 52, 54 and 56 filter the charge integrator 22, 24, and 26 outputs.

Each multiplexing switch 28, 30, and 32 is a circuit for outputting signals representative of the accumulated charges to external circuitry in the output interval. Multiplexing switches 28, 30, and 32 place the outputs of the charge integrators 22, 24, and 26, which consist of signals representative of their respective detector element 11, 12, and 14 outputs, onto a common output bus 34. The output bus 34 communicates the outputs to external circuitry such as the on-board data processor. Each channel is output onto the output bus 34 at the same rate that a similar prior art detector array would output signals to the on-board data processor.

The scanning circuit comprises a number of channels ($D_o$ through $D_n$). The number of channels ($n-1$) corresponds to the number of detector elements to be scanned by the scanning circuit. Each channel has one charge integrator, one high pass filter, and one multiplexing switch.

As shown in FIG. 6, each charge integrator 24 comprises a first capacitor 46 for storing as a charge the current output by the dedicated detector element 12 during the charge accumulation interval. This storing of the detector element 12 output is defined as integration. The voltage across first capacitor 46 is representative of the integrated detector element 12 output current. Therefore, the voltage across first capacitor 46 is representative of the detector element 12 output signal.

A second capacitor 48 may be switched into the charge integrator 24 circuit such that it is in parallel with first capacitor 46. Second capacitor 48 then accumulates a portion of the charge which would otherwise have accumulated upon first capacitor 46. The proportion of the charge accumulating on capacitor 48 is determined by the ratio of the capacitance of second capacitor 48 to the capacitance of first capacitor 46.

The addition of capacitor 48 to the charge integrator circuit increases the dynamic range of the charge integrator and lowers the circuit's gain. Transistor 40, which is externally controllable by the on-board data processor (not shown), is used to switch second capacitor 48 into the charge integrator 24 circuit.

Reset switch 38, controllable by the external on-board data processor, discharges first 46 and second 48 capacitors prior to each interrogation of detector element 12. This assures that substantially none of the previous charge remains upon either of the capacitors 46 and 48.

The voltage developed across capacitors 46 and 48 is applied to the gate of transistor 50 which provides a high impedance input to the high pass filter 36. This prevents the charge accumulated upon capacitors 46 and 48 from being bled off by the input to the high pass filter 54.

High pass filter 54 is electrically connected intermediate charge integrator 24 and multiplexing switch 30 in order to remove low frequency noise or clutter from the output detector signal. Clutter typically comprises the relatively stationary background observed by a staring focal plane infrared array. The stationary background is therefore that part of the signal having relatively low frequency components. Since the background is typically not of interest when tracking moving targets, the signal processing requirements are simplified when these low frequency components are eliminated from the detector element signals.

The filtered output of high pass filter 54 is applied to the gate of amplifying transistor 44. When a signal is applied to $A_i$, switching transistor 42 conducts and $V_{DD}$ is applied to the drain of amplifying transistor 44 such that amplifying transistor 44 conducts in response to the output of high pass filter 54. The output of high pass filter 54 is thereby communicated through amplifying transistor 44 and output line $D_i$ to the output bus 34. The output bus 34 can communicate the detector output signals to either additional on-focal plane signal processing circuitry or to the on-board data processor. Each of the detector channels $D_o$ through $D_n$ is interrogated sequentially by the on-board data processor. This is accomplished by successively applying address signals $A_o$ through $A_n$ to each of the scanning circuit's multiplexer switches to place each respective detector output on the output bus 34.

In order to maintain the frame scan rate, the accumulation of charges representative of the outputs of detector elements and the outputting of signals representative of the accumulated charges must occur within a single scan cycle. The output signals are then communicated to external circuitry such that signals representative of the outputs of all detector elements for a given scanning circuit are output within one scan cycle. In situations where the frame scan rate can be reduced, it is possible to extend the integration time such that charges representative of the outputs of the detector elements are accumulated within the scan cycle and output outside the scan cycle. Extending the integration time further improves the signal to noise ratio of the detector output signals and likewise further increases the reliability of the analog to digital conversion process.

It is understood that the exemplary scanning circuit described herein and shown in the drawing represents only a presently preferred embodiment of the invention. Indeed, various modifications and additions may be made to such embodiment without departing from the spirit and scope of the invention. For example, various signal processing circuitry may be added intermediate the charge integrators and the multiplexing switches. Also, various means other than a capacitor may be utilized to provide a voltage representative of the detector element current output over a time interval. Thus, these and other modifications and additions may be obvious to those skilled in the art and may be implemented to adapt the present invention for use in a variety of different applications.

What is claimed is:

1. A scanning circuit for improving the signal-to-noise ration of signals output from detector elements in an infrared detector array to external circuitry during a scan cycle, the scan cycle including a charge accumulation interval and an output interval, the length of the scan cycle determining the frame scan rate, the scanning circuit comprising:
   (a) a plurality of first circuits connected to dedicated detector elements for accumulating charges representative of the outputs of the detector elements, the charges being accumulated over a charge accumulation interval greater than the output interval; and
   (b) a plurality of dedicated second circuits connected to said first circuits for outputting signals representative of the accumulated charges to the external circuitry, the signals being output in the output interval, both the charge accumulation interval and the output interval occurring within a single scan cycle; and
   (c) wherein the effects of transient noise are reduced and a more complete representation of objects within the detector elements field of view is obtained without decreasing the frame scan rate.

2. The scanning circuit as recited in claim 1 wherein the charge integration interval is greater than one half of the scan cycle.

3. The scanning circuit as recited in claim 1 wherein the plurality of first circuits for accumulating charges representative of the outputs of the detector elements accumulate a sufficient portion of the detector's output to improve the probability of detecting changes in the detector output level while maintaining the detector array frame scan rate.

4. The scanning circuit as recited in claim 1 further comprising:
   (a) a common output bus for communicating signals from said first circuits to the external circuitry;
   (b) wherein said second circuits for outputting signals representative of the accumulated charges comprise first switches for communicating the signals representative of the accumulated charges to said common output bus, such that the signals representative of the accumulated charges stored within said first circuits can be sequentially switched to said common output bus.

5. The scanning circuit as recited in claim 4 wherein said first circuits further comprise first capacitors onto which the accumulated charges representative of the outputs of the detector elements are accumulated and stored.

6. The scanning circuit as recited in claim 5 wherein said first circuits further comprise second switches for discharging said first capacitors prior to the accumulation of charges thereupon to insure that the charge accumulated upon said capacitors is substantially free from any previously accumulated charge.

7. The scanning circuit as recited in claim 6 wherein said first circuits further comprise:
   (a) second capacitors for accumulating charges representative of the output of the detector elements such that the charges are divided among said first and said second capacitors to vary the gain and dynamic range of the first circuits; and
   (b) third switches for connecting said second capacitors in parallel with said first capacitors.

8. A scanning circuit for improving the signal-to-noise ratio of signals output from detector elements in an infrared detector array to external circuitry during a scan cycle, the scan cycle including a charge accumulation interval and an output interval, the length of the scan cycle determining the frame scan rate, the scanning circuit comprising:
   (a) a plurality of charge integrators for receiving the current outputs of dedicated detector elements and integrating the current outputs over a charge accumulation interval;

(b) wherein said charge integrators are operative to generate voltage outputs representative of the total current received from the detector elements during the charge accumulation interval;

(c) first switches connected to the outputs of said charge integrators for sequentially outputting the voltage output of said charge integrators such that the voltage outputs of said charge integrators can be output in an output interval; and (d) wherein the charge accumulation interval is longer than the output interval and both the charge accumulation interval and the output interval occur within a single scan cycle without decreasing the frame scan rate.

9. The scanning circuit as recited in claim 8 wherein said charge integrators comprise:

(a) first capacitors for storing the output of the dedicated detector elements to which said charge integrators are connected, the output of the detector element being stored as a charge, the voltage across said first capacitors being representative of the amount of output so stored; and (b) second switches for discharging said first capacitors prior to each interrogation of the dedicated detector elements to which said charge integrators are connected.

10. The scanning circuit as recited in claim 9 wherein each of said charge integrators further comprises:

(a) at least one second capacitor, said second capacitor being connectable in parallel with said first capacitor, the current output of the detector element being split between said first and second capacitors such that the gain of said charge integrator is reduced and the dynamic range of said charge integrator is increased when said second capacitor is connected in parallel with said first capacitor; and (b) third switches for connecting said second capacitor in parallel with said first capacitor;

(c) wherein said second switches discharge said second capacitors as well as said first capacitors prior to each interrogation of the detector elements to which the charge integrators are connected.

11. The scanning circuit as recited in claim 10 further comprising high pass filters connected intermediate said charge integrators and said first switches to reduce constant background information content of the detector element signal to reduce the amount of processing required by external circuitry.

12. The scanning circuit as recited in claim 11 wherein the charge integrators further function as low pass filters to remove high frequency noise from the detector output signals to reduce the amount of processing required by external circuitry.

13. A method for processing output signals from detector elements in an infrared detector array during a scan cycle, the scan cycle including a charge accumulation interval and an output interval, the length of the scan cycle determining the frame scan rate, to increase the signal to noise ration characteristics of the output signals the method comprising:

(a) accumulating charges representative of the outputs of the detector elements, the charges being accumulated over the charge accumulation interval; and (b) outputting signals representative of the accumulated charges to external circuitry, the signals being output over the output interval, both the charge accumulation interval and the output interval occurring within a single scan cycle;

(c) wherein the charge accumulation interval is greater than the output interval such that the effects of transient noise are reduced and a more complete representation of objects within the detector element field of view can be obtained without the detector element field of view can be obtained without decreasing the frame scan rate.

14. The method as recited in claim 13 wherein the step of accumulating charges representative of the outputs of the detector elements over a charge accumulation interval comprises capturing a sufficient portion of the detector's output to improve the probability of detecting changes in the detector output level while maintaining the detector array frame scan rate.

15. The method as recited in claim 13 wherein the step of outputting signals representative of the accumulated charges comprises sequentially switching the signals representative of the accumulated charges to a common output bus.

16. The method as recited in claim 15 wherein:

(a) the step of accumulating charges representative of the outputs of detector elements further comprises accumulating and storing the charges representative of the outputs of detector elements upon capacitors; and (b) the step of outputting signals representative of the accumulated charges further comprises multiplexing the signals representative of the accumulated charges to a common output bus in response to externally generated address signals, the externally generated address signals being sequentially applied to switches to enable the switches to output the signals representative of the accumulated charges to the common output bus.

17. The method as recited in claim 16 further comprising the step of discharging the capacitors prior to the step of accumulating charges representative of the outputs of detector elements upon the capacitors, to insure that the charges accumulated upon the capacitors are free from any previously accumulated charge.

18. The method as recited in claim 17 wherein:

(a) the step of accumulating charges representative of the outputs of the detector elements comprises accumulating the charges upon a plurality of capacitors such that the charge representative of the output of a particular detector element can be divided among more than one capacitor to vary the gain and dynamic range of the circuit; and (b) the step of discharging the capacitors prior to the step of accumulating charges representative of the outputs of detector elements further comprises discharging all capacitors upon which charges representative of the outputs of the detector elements are stored.

19. The method as recited in claim 18 wherein the step of accumulating charges representative of the outputs of detector elements and the step of outputting signals representative of the accumulated charges occur within a single scan cycle.

20. The method as recited in claim 18 wherein the step of outputting signals representative of the accumulated charges is delayed with respect to the step of accumulating charges representative of the outputs of detector elements such that the step of outputting signals representative of the accumulated charges occurs outside a single scan cycle.

21. A method for improving the signal to noise ratio of the output of detector elements in an infrared detector array during a scan cycle, the scan cycle including a charge accumulation interval and an output interval, the length of the scan cycle determining the frame scan rate, the method comprising:
   (a) communicating the output of a plurality of detector elements to a corresponding plurality of dedicated charge integrators over the charge accumulation interval;
   (b) generating voltages at the output of the charge integrators, the voltages being representative of the total output from the detector elements to their dedicated charge integrators;
   (c) sequentially connecting the voltages formed within the charge integrators to a common output bus, such that the voltages formed by all charge integrators are connected to the common output bus within the output interval;
   (d) wherein the charge accumulation interval is greater than the output interval and both the charge accumulation interval and the output interval occur within a single scan cycle without decreasing the frame scan rate; and
   (e) wherein the signal-to-noise ratio of the output of the detector elements is increased by increasing the interrogation time of the detector elements.

22. The method as recited in claim 21 wherein the step of communicating the output of a plurality of detector elements to a corresponding plurality of dedicated charge integrators comprises:
   (a) discharging a plurality of first capacitors to insure that substantially none of any charge previously accumulated thereon remains; and
   (b) communicating the output of a plurality of detector elements to the plurality of first capacitors.

23. The method as recited in claim 22 wherein the step of communicating the output of a plurality of detector elements to a corresponding plurality of dedicated charge integrators further comprises:
   (a) discharging a plurality of second capacitors when discharging the plurality of first capacitors to insure that substantially none of any charge previously accumulated upon the second capacitors remains; and
   (b) simultaneously communicating the outputs of the plurality of detector elements to the plurality of second capacitors when the current outputs are communicated to the plurality of first capacitors, to vary the gain and dynamic range of the charge integrator.

24. The method as recited in claim 23 further comprising the step of filtering low frequency components out of the detector signals prior to the step of sequentially connecting the voltage formed within each charge integrator to a common output bus.

* * * * *